United States Patent
Ding et al.

(10) Patent No.: US 10,055,068 B2
(45) Date of Patent: Aug. 21, 2018

(54) TOUCH DISPLAY PANEL AND TOUCH DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventors: Hong Ding, Shanghai (CN); Qijun Yao, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 14/792,570

(22) Filed: Jul. 6, 2015

(65) Prior Publication Data
US 2016/0291767 A1     Oct. 6, 2016

(30) Foreign Application Priority Data
Apr. 1, 2015   (CN) .......................... 2015 1 0152679

(51) Int. Cl.
| G06F 3/041 | (2006.01) |
| G06F 3/044 | (2006.01) |
| G02F 1/1333 | (2006.01) |

(52) U.S. Cl.
CPC ............ *G06F 3/044* (2013.01); *G06F 3/0412* (2013.01); *G02F 1/13338* (2013.01); *G06F 2203/04107* (2013.01)

(58) Field of Classification Search
CPC ................... G06F 3/412; G06F 3/044; G06F 2203/04107; G02F 1/13338
See application file for complete search history.

(56) References Cited

U.S. PATENT DOCUMENTS

2012/0274603 A1*  11/2012  Kim ...................... G06F 3/0412
                                                                 345/174
2014/0168138 A1    6/2014  Kuo et al.
(Continued)

FOREIGN PATENT DOCUMENTS

| CN | 103176674 A | 6/2013 |
| CN | 103488366 A | 1/2014 |
| CN | 104049798 A | 9/2014 |

OTHER PUBLICATIONS

Chinese Application No. 201510152679.0, First Office Action dated May 19, 2017.

*Primary Examiner* — Kwang-Su Yang
(74) *Attorney, Agent, or Firm* — Alston & Bird LLP (57) ABSTRACT

A touch display panel is disclosed. The touch display panel includes a first substrate, a second substrate disposed opposite to the first substrate, and a plurality of touch electrodes disposed on a side of the first substrate facing the second substrate. The plurality of touch electrodes are disposed in an array. The touch display panel also includes a conductive layer disposed on the second substrate, where the conductive layer includes a plurality of openings, and where portions of the touch electrodes are exposed through the openings. In addition, a projection of the conductive layer on the second substrate overlaps the touch electrodes, and the conductive layer is grounded or connected to a constant potential during a touch period.

8 Claims, 6 Drawing Sheets

(56) References Cited

U.S. PATENT DOCUMENTS

| | | | |
|---|---|---|---|
| 2014/0184951 A1* | 7/2014 | Yeh | G06F 3/044 349/12 |
| 2016/0048232 A1 | 2/2016 | Liu et al. | |
| 2016/0216799 A1* | 7/2016 | Yang | G06F 3/044 |
| 2016/0216817 A1* | 7/2016 | Yang | G06F 3/0412 |
| 2016/0349889 A1* | 12/2016 | Yang | G02F 1/13338 |
| 2016/0364061 A1* | 12/2016 | Zhao | G06F 3/0416 |

* cited by examiner

Prior Art

TOUCH DISPLAY PANEL AND TOUCH DISPLAY DEVICE

CROSS-REFERENCES TO RELATED APPLICATIONS

The application claims the benefit of priority to Chinese Patent Application No. 201510152679.0, filed with the Chinese Patent Office on Apr. 1, 2015 and entitled "DISPLAY PANEL AND DISPLAY DEVICE", the content of which is incorporated herein by reference in its entirety.

TECHNICAL FIELD

The disclosure relates to the field of display, and in particular to a display panel and a display device.

BACKGROUND OF THE INVENTION

Due to advantages of small volume, light weight and low radiation, the display device is widely applied in various fields.

The display device generally has a touch function, and the touch electrode in the display device is likely to be triggered falsely.

BRIEF SUMMARY OF THE INVENTION

One inventive aspect is a touch display panel. The touch display panel includes a first substrate, a second substrate disposed opposite to the first substrate, and a plurality of touch electrodes disposed on a side of the first substrate facing the second substrate. The plurality of touch electrodes are disposed in an array. The touch display panel also includes a conductive layer disposed on the second substrate, where the conductive layer includes a plurality of openings, and where portions of the touch electrodes are exposed through the openings. In addition, a projection of the conductive layer on the second substrate overlaps the touch electrodes, and the conductive layer is grounded or connected to a constant potential during a touch period.

Another inventive aspect is a touch display device. The touch display device includes a touch display panel. The touch display panel includes a first substrate, a second substrate disposed opposite to the first substrate, and a plurality of touch electrodes disposed on a side of the first substrate facing the second substrate. The plurality of touch electrodes are disposed in an array. The touch display panel also includes a conductive layer disposed on the second substrate, where the conductive layer includes a plurality of openings, and where portions of the touch electrodes are exposed through the openings. In addition, a projection of the conductive layer on the second substrate overlaps the touch electrodes, and the conductive layer is grounded or connected to a constant potential during a touch period.

DETAILED DESCRIPTION OF THE PREFERRED EMBODIMENTS

Figure 1:
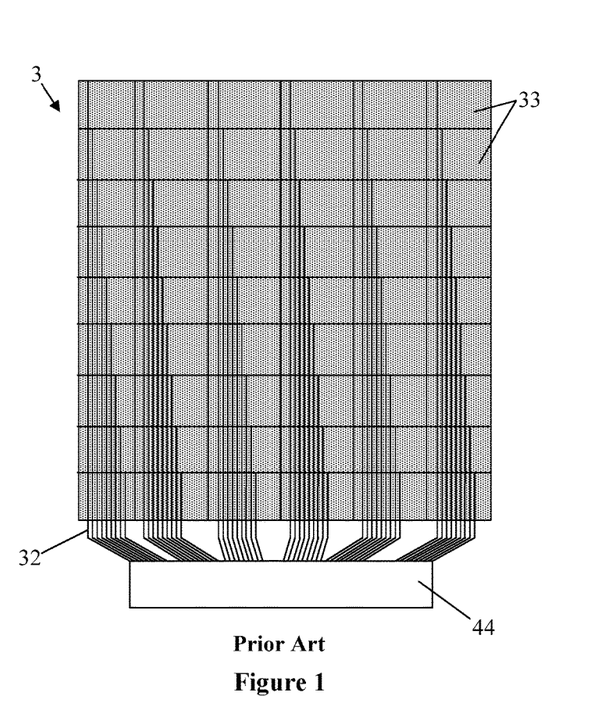
FIG. 1 is a schematic structural diagram of a conventional touch device with touch electrodes.

FIG. 1 shows a schematic structural diagram of a conventional touch device with touch electrodes. A common electrode 3 shown in FIG. 1 is divided into multiple blocks 33 serving as touch electrodes, and each touch electrode is connected to a touch chip 44 via a touch signal line 32.

It is found through research that, since blocks 33 (i.e., touch electrodes) are close to each other, the touch electrodes have a poor separation degree for a finger that is, the touch electrodes around a touch electrode touched by the finger are likely to be triggered falsely. In addition, the conventional application of the touch electrodes are susceptible to static electricity, and, the static electricity is apt to cause that the touch electrode is triggered falsely without being contacted by the finger or affect the touch electrode.

Figure 2:
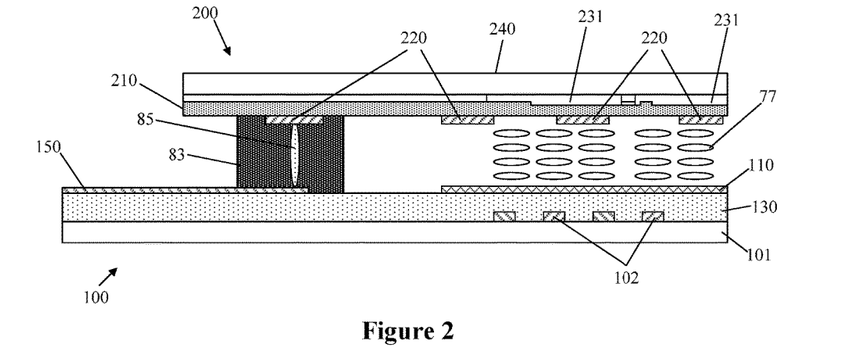
FIG. 2 is a side view of a first substrate and a second substrate of a touch display panel according to a first embodiment of the disclosure.
Figure 3:
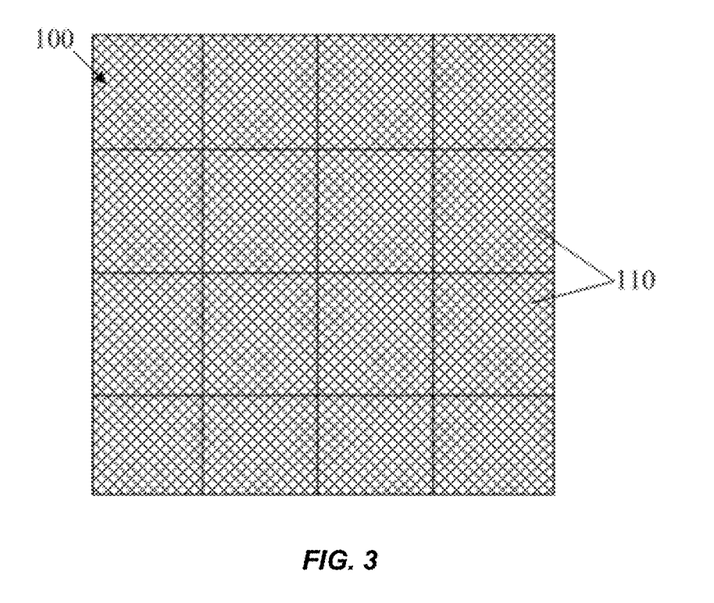
FIG. 3 is a top view of the first substrate of the touch display panel according to the first embodiment of the disclosure.
Figure 4:
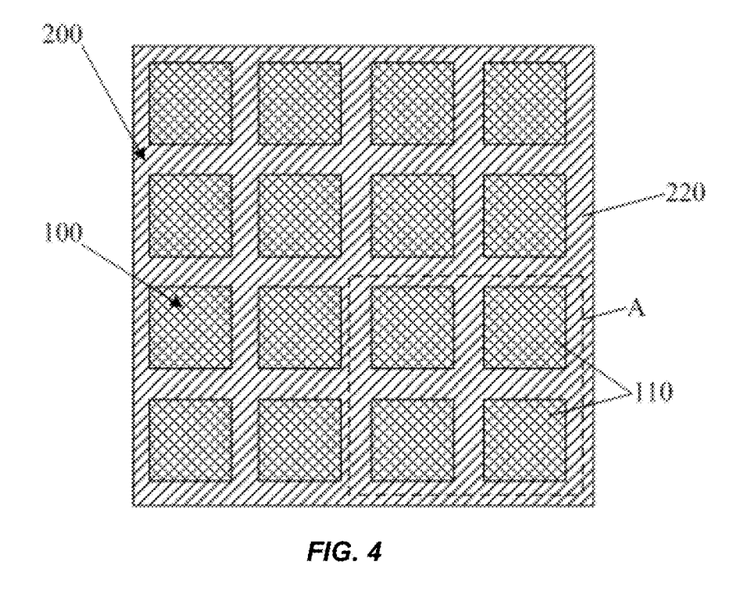
FIG. 4 is a top view of the first substrate and the second substrate of the touch display panel according to the first embodiment of the disclosure.
Figure 5:
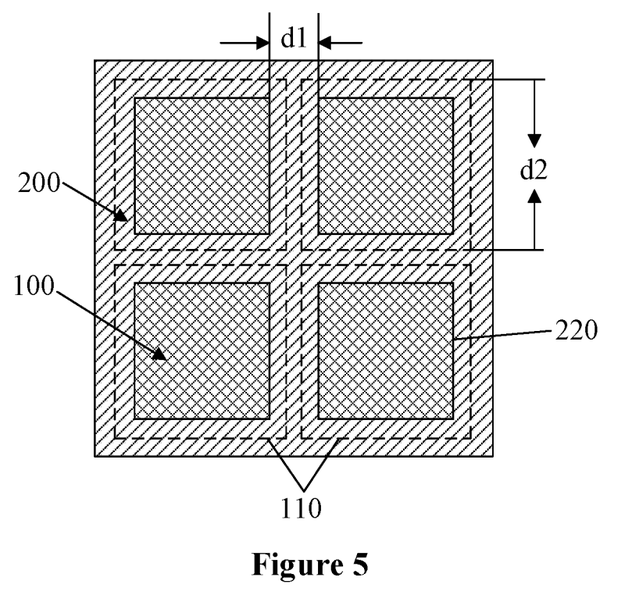
FIG. 5 is an enlarged view of a portion of the touch display panel in block A shown in FIG. 4.
Figure 6:
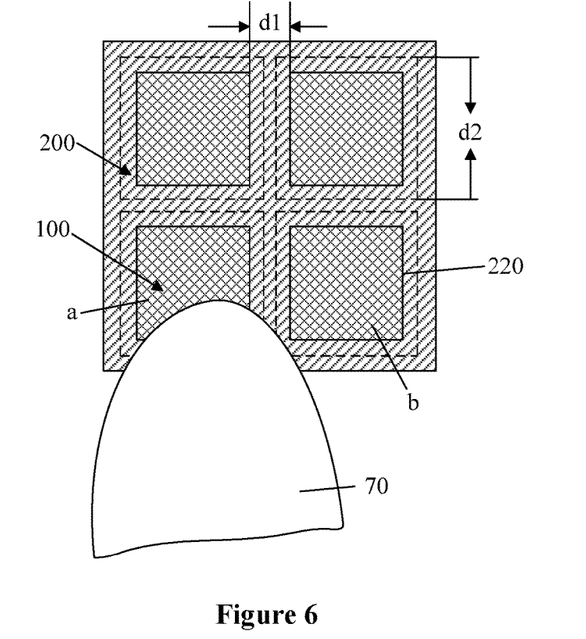
FIG. 6 is a schematic diagram of a practical application of a touch electrode shown in FIG. 5.

For the above problems, a touch display panel is provided according to embodiments of the disclosure. FIG. 2 to FIG. 6 show schematic structural diagrams of the touch display panel according to a first embodiment, FIG. 2 is a side view of a first substrate and a second substrate of a touch display panel according to a first embodiment of the disclosure, FIG. 3 is a top view of the first substrate of the touch display panel according to the first embodiment of the disclosure, FIG. 4 is a top view of the first substrate and the second substrate of the touch display panel according to the first embodiment of the disclosure, FIG. 5 is an enlarged view of a portion of the touch display panel in block A shown in FIG. 4, and FIG. 6 is a schematic diagram of a practical application of a touch electrode shown in FIG. 5.

The touch display panel according to the disclosure includes a first substrate 100.

In the embodiment, the first substrate 100 includes a TFT array substrate 101, an electrode 102 disposed on the TFT array substrate 101, and a dielectric layer 130 covering the TFT array substrate 101 and the electrode 102.

The first substrate 100 further includes multiple touch electrodes 110 disposed on a side of the first substrate 100 facing the second substrate. The touch electrodes 110 are disposed in a spaced array (as shown in FIG. 3).

The touch display panel according to the disclosure further includes a second substrate 200, which is disposed opposite to the first substrate 100 (as shown in FIG. 2).

In the embodiment, the second substrate 200 further includes a color filter 231, a light filter 240 and an organic film 210. The structure of the second substrate 200 is only exemplary, and is not limited in the disclosure.

In addition, a liquid crystal layer 77 is further disposed between the first substrate 100 and the second substrate 200, that is, the touch display panel according to the embodiment is a liquid crystal touch display panel. Whether the touch display panel is a liquid crystal display panel is not limited in the disclosure, and in other embodiments of the disclosure, for instance, an OLED may be used as a light source, thus the liquid crystal layer is not needed.

The touch display panel according to the disclosure further includes a conductive layer 220 disposed on the second substrate 200. The conductive layer 220 has a grid-shaped structure with multiple openings (as shown in FIG. 4 and FIG. 5), and portions of the touch electrodes 110 are exposed through the openings. The projection of the conductive layer 220 on the second substrate 200 overlaps with edges of the touch electrodes 110.

As shown in FIG. 4 and FIG. 5, a dotted line block in FIG. 5 represents an actual size of the touch electrode 110. The grid-shaped conductive layer 220 blocks an edge portion of each touch electrode 110 in a direction perpendicular to the first substrate 100 and the second substrate 200, that is, a distance between touch electrodes 110 becomes larger due to the conductive layer 220. In this way, the touch electrode 110 may have an increased separation degree of a finger.

As shown in FIG. 6, in the case that a finger touches the touch electrodes 110, for example, touch electrode a shown in FIG. 6, finger 70 will touch both touch electrode a and touch electrode b adjacent to touch electrode a according to the arrangement of touch electrode a and touch electrode b, but due to the conductive layer 220 according to the disclosure, the distance between touch electrode a and touch electrode b is increased, such that finger 70 does not touch the touch electrode b, thereby increasing the separation degree of a finger with respect to adjacent touch electrodes, that is, reducing the probability that other touch electrodes 110 (including a touch electrode 110 with small area touched by the finger and a touch electrode 110 which is not touched by the finger) around a touched electrode are triggered falsely.

It should be noted that, FIG. 6 is only illustrative, and the ratio between sizes of the touch electrode and the finger as shown in FIG. 6 may be different from the actual ratio, which is not limited in the disclosure.

In addition, the arrangement that the conductive layer 220 is disposed on the second substrate 200 is beneficial to achieve the above objects with minimum affection on the fabrication process of the first substrate 100, and beneficial to improve the fabrication efficiency in an actual fabrication process.

In addition, the conductive layer 220 according to the disclosure is grounded or connected to a constant potential in a touch period.

The way that conductive layer 220 is grounded or connected to a constant potential in the touch period is advantageous in that the conductive layer 220 may have effects of electrostatic shielding and conducting static electric charges away, since a material layer disposed on the touch electrode 110 may shield static electricity to some extent, and the conductive layer 220 grounded or connected to a constant potential may conduct the static electric charges away. That is, as compared with the conventional technology, with the disposed conductive layer according to the disclosure, the electrostatic interference to the touch electrode 110 is reduced, thereby reducing a probability that the touch electrode 110 is falsely triggered due to the static electricity.

How the conductive layer 220 is grounded or connected to a constant potential is illustrated in detail hereinafter.

In the embodiment, the conductive layer 220 is floated in a display period, which has no affection on the common electrode and a pixel electrode in the display period.

In the embodiment, width d1 between adjacent grids of the grid-shaped conductive layer 220 is set to be less than or equal to ¼ of width d2 of the touch electrode 110. The wider width d1 between adjacent grids of the conductive layer 220 is, the lower the resistance of the conductive layer 220 is, thus the static electric charges are easier to be conducted away. For example, in the case that width d1 between adjacent grids is 0.1 mm, a resistance between a center point and a corner of the conductive layer 220 is approximately 33972 ohms, in the case that width d1 between adjacent grids is increased to 0.5 mm, the resistance between the center point and the corner of the conductive layer 220 is reduced to approximately 8095 ohms, and in the case that width d1 between adjacent grids is 1 mm, the resistance between the center point and the corner of the conductive layer 220 is reduced to approximately 3111 ohms. It can be seen that: the wider width d1 between adjacent grids is, the lower the resistance between the center point and the corner of the conductive layer 220 is, that is, the lower the resistance of the conductive layer is, the easier the removing the static electric charges is.

In addition, wider width d1 between adjacent grids of the conductive layer 220 can result in a larger distance between adjacent touch electrodes, thereby further increasing the separation degree of a finger. However, if width d1 between adjacent grids of the conductive layer is too wide, the touch electrode 110 has an insufficient effective area (i.e., a portion of the touch electrode exposed from the conductive layer 220) with actual function, since too much area is blocked and the original size of each touch electrode 110 is determined. Therefore, in the embodiment, width d1 between adjacent grids of the grid-shaped conductive layer 220 is set to be less than or equal to ¼ of width d2 of the touch electrode 110, such that the capability for conducting the static electric away with respect to the conductive layer 220 may be improved and the separation degree of a finger with respect to the touch electrode 110 may be increased as much as possible, while the effective area for each touch electrode 110 is ensured.

It should be noted that, whether width d1 between adjacent grids of the grid-shaped conductive layer 220 is set to be less than or equal to ¼ of width d2 of the touch electrode 110 in the embodiment is not defined. In an actual operation, the size of the conductive layer 220 should be calculated as needed, for example, the size of the conductive layer 220 is calculated according to the resistance characteristic of the material of the conductive layer 220, and thus the size of the conductive layer 220 is not limited in the disclosure.

In the embodiment, a thickness of the conductive layer 220 ranges from 150 angstroms to 250 angstroms, inclusive. The conductive layer 220 with such thickness can achieve the above objects without being over-thick and thus wasting material and occupying space.

Similarly, the above range of thickness is only exemplary, and the thickness of the conductive layer 220 may be adjusted as needed in an actual operation, which is not limited in the disclosure.

In the embodiment, the conductive layer 220 is made of ITO material, which has a conduction capability and a high light transmittance, and thus the conductive layer 220 has a reduced affection on the light transmittance of the whole touch display panel.

As shown in FIG. 2, in the embodiment, the conductive layer 220 is disposed on a side of the second substrate 200 facing the first substrate 100, benefits of which lie in that since the touch display panel is viewed from a side of the second substrate 200 away from the first substrate 100, the arrangement that the conductive layer 220 is disposed on a side of the second substrate 200 facing the first substrate 100 means that the conductive layer 220 is disposed on a "back side" of the second substrate 200 relative to the viewing direction so that the pattern of the conductive layer 200 is nearly invisible, and has no affection on the touch display panel.

In the embodiment, the case that the conductive layer 220 is grounded is taken as an example, a ground end 150 is disposed on the first substrate 100, and the grid-shaped conductive layer 220 is grounded via the ground end in the touch period.

As described above, since in the embodiment the conductive layer 220 is disposed on a side of the second substrate 200 facing the first substrate 100, a conductive packaging adhesive 83 for packaging the first substrate 100 and the second substrate 200 is disposed between the second substrate 200 and the first substrate 100. Metal particles 85 are distributed in the package adhesive, and the conductive layer 220 is connected to the ground end via the conductive package adhesive.

In the embodiment, the metal particles 85 may be made of gold, which is not limited in the disclosure, and other metal materials such as copper and aluminum may be used to form the metal particles 85.

In addition, as described above, the conductive layer 220 according to the disclosure may alternatively connected to a constant potential, which can achieve the object of conducting static electric charges.

Figure 7:
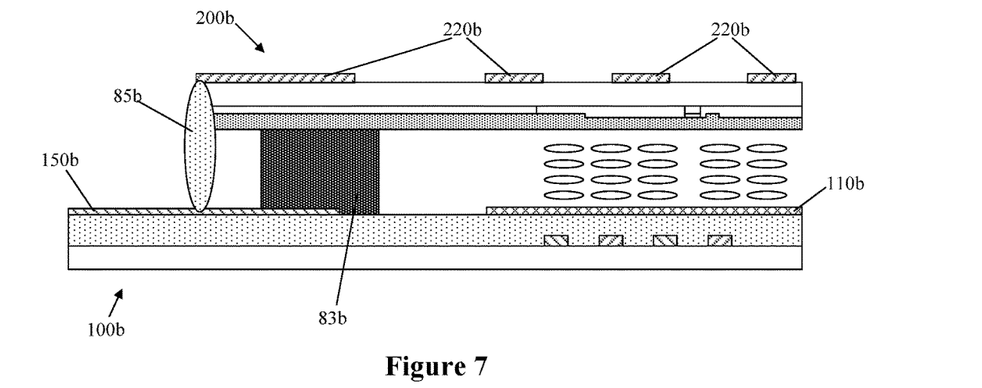
FIG. 7 is a side view of a first substrate and a second substrate of a touch display panel according to a second embodiment of the disclosure.

In addition, a touch display panel is provided according to a second embodiment of the disclosure. FIG. 7 shows a side view of a first substrate 100b and a second substrate 200b of the touch display panel according to the second embodiment of the disclosure. The second embodiment differs from the first embodiment in that in the second embodiment, the conductive layer 220b is disposed on a side of the second substrate 200b away from the first substrate 100b. Specifically, the conductive layer 220 is disposed on a surface on a side of the second substrate 200b away from the first substrate 100b, which can also reduce a probability that the touch electrode 110 is triggered falsely.

In addition, since practically the finger presses on a side of the second substrate 200b away from the first substrate 100b and the conductive layer 220b is disposed on a side of the second substrate 200b away from the first substrate 100b, the conductive layer 220b can be further close to the touching direction of the finger, which is beneficial to improve the conducting capability of the conductive layer 220b.

Specifically, the conductive layer 220b according to the embodiment is formed on a surface of the second substrate 200b away from the first substrate 100b.

Furthermore, in the embodiment, a filling layer is disposed in grids of the grid-shaped conductive layer 220b, and there is a gap between the filling layer and the grid-shaped conductive layer 220b.

The benefits of disposing the filling layer lie in alleviating the problem that the pattern of the grid-shaped conductive layer 220b is visible. Since in the case that no filling layer is disposed, the grid-shaped conductive layer 220b may be visible; and in the case that a filling layer is disposed, visibility of the grid-shaped conductive layer 220b can be reduced to some extent.

The embodiment further differs from the first embodiment in that, in the embodiment, a conductive adhesive 85b is disposed between the second substrate 200b and the first substrate 100b, and the grid-shaped conductive layer 220b is connected to the ground end 150b via the conductive adhesive. That is, in the embodiment the first substrate 100b and the second substrate are packaged via the packaging adhesive 83b, and the packaging adhesive 83b does not have a conductive function, since in the embodiment the conductive layer 220b is formed on a surface of the second substrate 200b away from the first substrate 100b, and it is difficult to form a connection between the conductive layer 220b and the packaging adhesive 83b. Hence, in the embodiment, the conductive adhesive 85b is added between the first substrate 100b and the second substrate 200b, to achieve the electric connection between the conductive layer 220b and the ground end 150b disposed on the first substrate 100b.

In addition, in the embodiment, the conductive layer 220b is disposed on a side of the second substrate 200b away from the first substrate 100b, and has little affection on the common electrode and the pixel electrode in the display period, therefore the conductive layer 220b may be floated in the display period as the foregoing embodiment, and may alternatively be grounded or connected to a constant potential in the display period.

Figure 8:
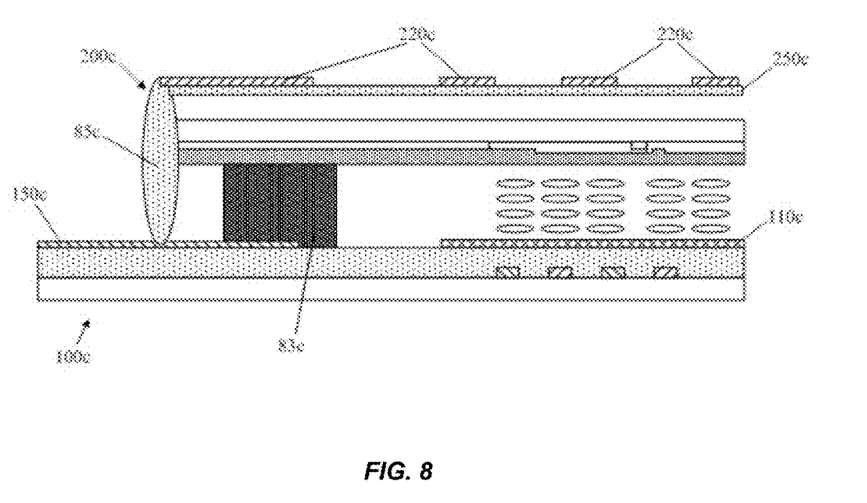
FIG. 8 is a side view of a first substrate and a second substrate of a touch display panel according to a third embodiment of the disclosure.

In addition, a touch display panel is provided according to a third embodiment of the disclosure. FIG. 8 shows a side view of a first substrate 100c and a second substrate 200c of the touch display panel according to the third embodiment of the disclosure.

The third embodiment differs from the first embodiment and the second embodiment in that, in the embodiment, the conductive layer 220c is disposed on a side of the second substrate 200c away from the first substrate 100c, and the conductive layer 220c is not directly disposed on the second substrate 200 as the conductive layer 220c according to the second embodiment, but is adhered to a thin film layer 250c which is disposed on a surface of the second substrate 200c away from the first substrate 100c. In this way, a probability that the touch electrode 110c is triggered falsely can also be reduced.

In addition, in an actual fabrication process, the conductive layer 220c may be formed independently on the thin film layer 250c before the thin film layer 250c is disposed on the second substrate 200c, which is beneficial to simplify the fabrication process and reduce affection on the structure of the second substrate 200c when forming the conductive layer 220c.

Similar to the second embodiment, in the embodiment, since the conductive layer 220c is located on a side of the second substrate 200c away from the first substrate 100c, a conductive adhesive 85c is disposed between the second substrate 200c and the first substrate 100c, and the grid-shaped conductive layer 220c is connected to the ground terminal 150c through the conductive adhesive 85c. In addition, the first substrate 100c and the second substrate 200c are packaged via the packaging adhesive 83c.

In addition, similar to the second embodiment, since the conductive layer 220c is located on a side of the second substrate 200c away from the first substrate 100c, the conductive layer 220c has little affection on the common electrode and the pixel electrode in the display period. Therefore the conductive layer 220c may be floated in the display period, and may alternatively be grounded or connected to a constant potential in the display period.

In addition, other structures of the touch display panel are not limited according to the disclosure. For example, a TFT array of the first substrate in the touch display panel may be a top-gate structure or a bottom-gate structure; or the first substrate may be a Top-Com structure or a Mid-Com structure; and the touch electrode may be a self-capacitance electrode or a mutual capacitance electrode, which has no affection on the implementation of the disclosure, and thus is not limited to the disclosure.

Figure 9:
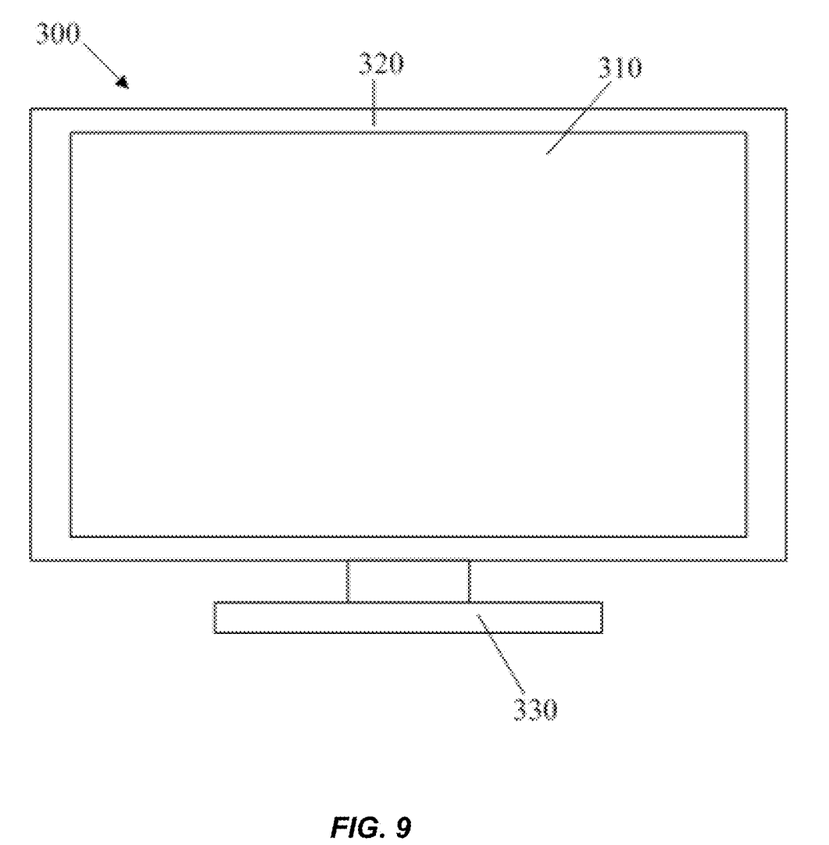
FIG. 9 is a schematic structural diagram of a touch display device according to an embodiment of the disclosure.

In addition, a touch display device is further provided according to the disclosure. FIG. 9 is a schematic structural diagram of the touch display device 300 according to an embodiment.

The touch display device 300 includes the above touch display panel 310. As described above, the touch display panel 310 is beneficial for the touch display device 300 to increase the separation degree of a finger with respect to the touch electrode 110, reduce the probability that the touch electrode 110 which is not contacted by the finger is triggered falsely, and achieve the above objects with minimum affection on the fabrication process of the first substrate 100. In addition, the conductive layer 220 is grounded in the touch period, thereby reducing electrostatic interference to the touch electrode 110, and reducing the probability that the touch electrode 110 is triggered falsely due to the static electricity.

In addition, the touch display device 300 further includes a shell 320 disposed outside the touch display panel 310 and a base 330 for supporting the shell 320.

It should be noted that, the shell 320 and the base 330 in the embodiment are only illustrative, whether the touch display deice 300 include the shell 320 and the base 330 and specific structures of the shell 320 and the base 330 are not limited in the disclosure.

Although described above, the disclosure is not limited thereto. Various changes and modifications can be made to the disclosure by those skilled in the art without departing from the spirit and scope of the disclosure, hence the scope of the disclosure should be subject to the scope defined by claims.

What is claimed is:

1. A touch display panel, comprising:
a first substrate;
a second substrate disposed opposite and parallel to the first substrate;
a plurality of touch electrodes disposed on a side of the first substrate facing the second substrate, wherein the plurality of touch electrodes are arranged in rows and columns of an array; and
a grid-shaped conductive layer disposed on the second substrate, wherein the grid-shaped conductive layer comprises a plurality of openings overlaying the rows and columns of the touch electrodes array on the first substrate, wherein a projection of each of the plurality of openings on the first substrate is enclosed within each of the touch electrodes, and each of the touch electrodes enclosing the projection of the opening is composed of a portion overlapping with the openings and a portion non-overlapping with the openings, wherein the non-overlapping portion encloses the overlapping portion and is shielded by the grid-shaped conductive layer in a direction perpendicular to the first substrate, and wherein the grid-shaped conductive layer is grounded or connected to a constant potential during a touch period.

2. The touch display panel according to claim 1, wherein the grid-shaped conductive layer is disposed on a side of the second substrate facing the first substrate.

3. The touch display panel according to claim 2, wherein the grid-shaped conductive layer is floated during a display period.

4. The touch display panel according to claim 1, wherein a ground end is disposed on the first substrate, and the grid-shaped conductive layer is grounded via the ground end during the touch period.

5. The touch display panel according to claim 4,
wherein the grid-shaped conductive layer is disposed on a side of the second substrate facing the first substrate,
wherein a conductive packaging adhesive is disposed between the second substrate and the first substrate, wherein metal particles are distributed in the conductive packaging adhesive, and
wherein the grid-shaped conductive layer is connected to the ground end via the conductive packaging adhesive.

6. The touch display panel according to claim 1, wherein a width between adjacent grids of the grid-shaped conductive layer is less than or equal to ¼ of a width of the touch electrode.

7. The touch display panel according to claim 1, wherein a thickness of the grid-shaped conductive layer is between about 150 angstroms and about 250 angstroms.

8. A touch display device, comprising a touch display panel, the touch panel comprising:
a first substrate;
a second substrate disposed opposite and parallel to the first substrate;
a plurality of touch electrodes disposed on a side of the first substrate facing the second substrate, wherein the plurality of touch electrodes are arranged in rows and columns of an array; and
a grid-shaped conductive layer disposed on the second substrate, wherein the grid-shaped conductive layer comprises a plurality of openings, overlaying the rows and columns of the touch electrodes array on the first substrate, wherein a projection of each of the plurality of openings on the first substrate is enclosed within each of the touch electrodes, and each of the touch electrodes enclosing the projection of the opening is composed of a portion overlapping with the openings and a portion non-overlapping with the openings, wherein the non-overlapping portion encloses the overlapping portion and is shielded by the grid-shaped conductive layer in a direction perpendicular to the first substrate, and wherein the grid-shaped conductive layer is grounded or connected to a constant potential during a touch period.

* * * * *